(12) United States Patent
Schütz

(10) Patent No.: US 8,727,175 B2
(45) Date of Patent: May 20, 2014

(54) WIDE-NECK DRUM OF THERMOPLASTIC MATERIAL

(75) Inventor: Udo Schütz, Westerwald (DE)

(73) Assignee: Schütz GmbH & Co. KGaA, Selters/Westerwald (DE)

( * ) Notice: Subject to any disclaimer, the term of this patent is extended or adjusted under 35 U.S.C. 154(b) by 0 days.

(21) Appl. No.: 12/378,283

(22) Filed: Feb. 12, 2009

(65) Prior Publication Data

US 2009/0218358 A1    Sep. 3, 2009

(30) Foreign Application Priority Data

Feb. 16, 2008  (DE) .......................... 10 2008 002 185

(51) Int. Cl.
| | | |
|---|---|---|
| *B65D 1/20* | (2006.01) | |
| *B65D 51/18* | (2006.01) | |
| *B65D 39/08* | (2006.01) | |
| *B65D 39/10* | (2006.01) | |
| *B60K 15/03* | (2006.01) | |

(52) U.S. Cl.
CPC ................ *B65D 1/20* (2013.01); *B65D 39/084* (2013.01); *B65D 51/18* (2013.01); *B65D 39/10* (2013.01); *B60K 15/03177* (2013.01)
USPC ....................... 220/601; 220/254.8

(58) Field of Classification Search
CPC .......... B65D 1/20; B65D 1/12; B65D 39/084; B65D 39/082; B65D 39/08; B65D 39/10; B65D 51/18; B60K 15/0406; B60K 15/04; B60K 15/03177
USPC ................ 220/601, 293, 288, 304, 319, 4.13, 220/4.12, 675, 254.8, 254.1, 315
See application file for complete search history.

(56) References Cited

U.S. PATENT DOCUMENTS

| | | | | |
|---|---|---|---|---|
| 1,831,199 A | * | 11/1931 | Seitz .............................. | 220/214 |
| 3,086,679 A | * | 4/1963 | Bijvoet ......................... | 220/661 |
| 3,405,837 A | * | 10/1968 | Carpenter, Jr. ............. | 220/258.3 |
| 4,164,304 A | * | 8/1979 | Roberson ....................... | 220/214 |
| 4,166,549 A | * | 9/1979 | Schutz et al. .................. | 220/319 |
| 4,347,947 A | * | 9/1982 | Hammes ....................... | 220/378 |
| 4,643,323 A | * | 2/1987 | Schutz .......................... | 220/604 |
| 4,880,138 A | * | 11/1989 | Pfeiffer et al. ................ | 220/320 |
| 4,941,584 A | * | 7/1990 | Bowers et al. ................ | 220/601 |
| 5,016,775 A | * | 5/1991 | Budenbender ................ | 220/288 |

(Continued)

FOREIGN PATENT DOCUMENTS

| | | | | | |
|---|---|---|---|---|---|
| DE | | 3926821 A1 | * | 2/1990 | ............... B65D 8/02 |
| DE | 102005004548 | | | 12/2005 | |
| GB | | 2227736 A | * | 8/1990 | ............... B65D 1/20 |

OTHER PUBLICATIONS

Oberg et al. "Machinery's Handbook, 26th Edition". Industrial Press, 2000, pp. 1817-1824.*

*Primary Examiner* — Robert J Hicks
(74) *Attorney, Agent, or Firm* — McGlew and Tuttle, P.C.

(57) ABSTRACT

A wide-neck drum of thermoplastic material has a removable cover and a clamping ring closure. The drum is provided with an arrangement of a bung socket of a filling and discharge bung of the cover which is outwardly offset relative to the center point of the bung cover. The bung is provided at a flat or slightly curved bottom which has an upwardly protruding cover rim for fastening the bung cover on the drum opening rim.

7 Claims, 2 Drawing Sheets

(56) References Cited

U.S. PATENT DOCUMENTS

| | | | |
|---|---|---|---|
| 5,129,537 A * | 7/1992 | Bordner et al. | 220/321 |
| 5,413,240 A * | 5/1995 | Hunter et al. | 220/254.8 |
| 5,445,293 A * | 8/1995 | Schutz | 220/319 |
| 5,568,876 A * | 10/1996 | Schutz | 220/254.8 |
| 5,593,060 A * | 1/1997 | Przytulla | 220/319 |
| 5,785,201 A * | 7/1998 | Bordner et al. | 220/321 |
| 5,941,406 A * | 8/1999 | Przytulla | 220/254.2 |
| 2002/0125205 A1* | 9/2002 | Hathaway et al. | 215/356 |
| 2005/0247371 A1* | 11/2005 | Chadbourne et al. | 141/351 |
| 2007/0190827 A1* | 8/2007 | Schutz | 439/135 |

* cited by examiner

WIDE-NECK DRUM OF THERMOPLASTIC MATERIAL

BACKGROUND OF THE INVENTION

1. Field of the Invention

The present invention relates to a wide-neck drum of thermoplastic material with a removable bung cover and a clamping ring closure.

2. Description of the Related Art

A wide-neck drum of the above-described type is disclosed in DE 10 2005 004 548 A1.

SUMMARY OF THE INVENTION

The object of the present invention is to further develop the cover of the wide-neck drum of the type described above in such a way that the drum can be filled in an automatic filling device.

In accordance with the present invention, this object is met by a wide-neck drum of thermoplastic material which has a removable cover and a clamping ring closure, and is provided with an arrangement of the bung socket of the filling and discharge bung of the cover which is outwardly offset relative to the center point of the bung cover, wherein the bung is provided at a flat or slightly curved bottom which has an upwardly protruding cover rim for fastening the bung cover on the drum opening rim.

The configuration of the wide-neck drum according to the present invention makes possible filling of the drum in an automatic filling installation.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

Figure 1:
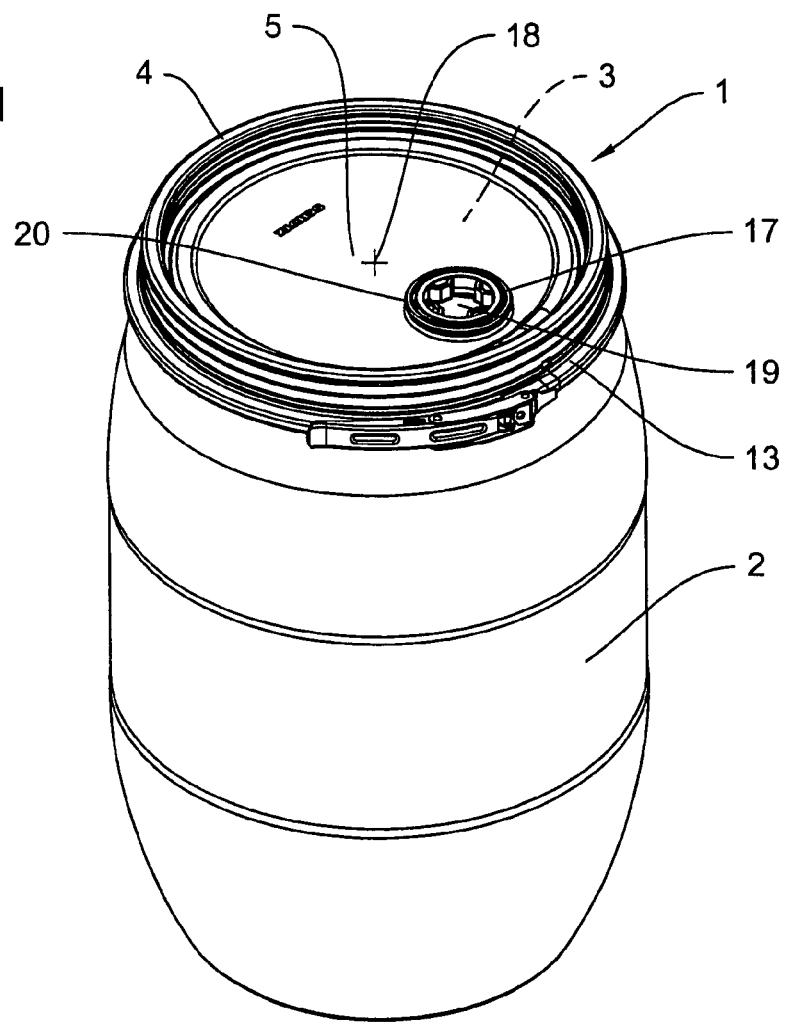
Figure 2:
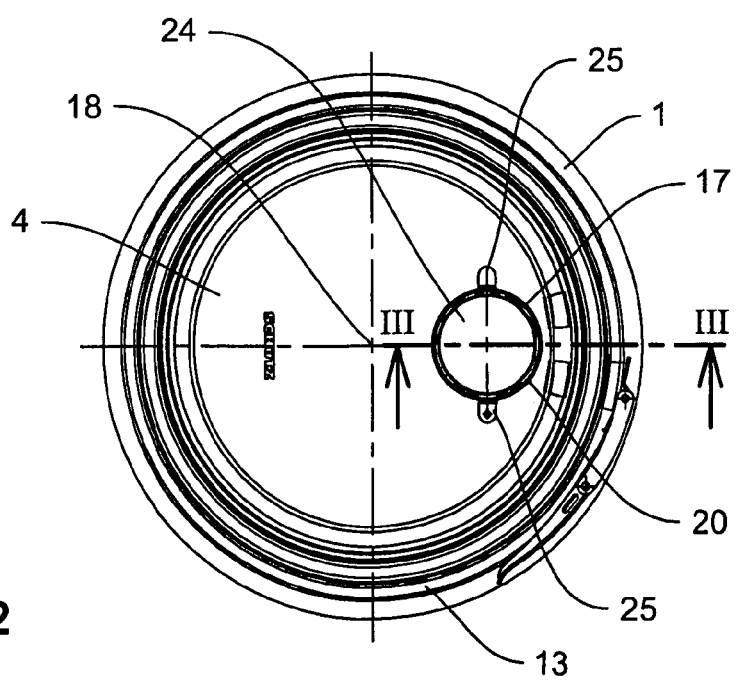

IN THE DRAWING:

FIG. 1 is a perspective illustration of the wide-neck drum with bung cover and clamping ring closure according to the present invention;

FIG. 2 is a top view of the drum of FIG. 1; and

Figure 3:
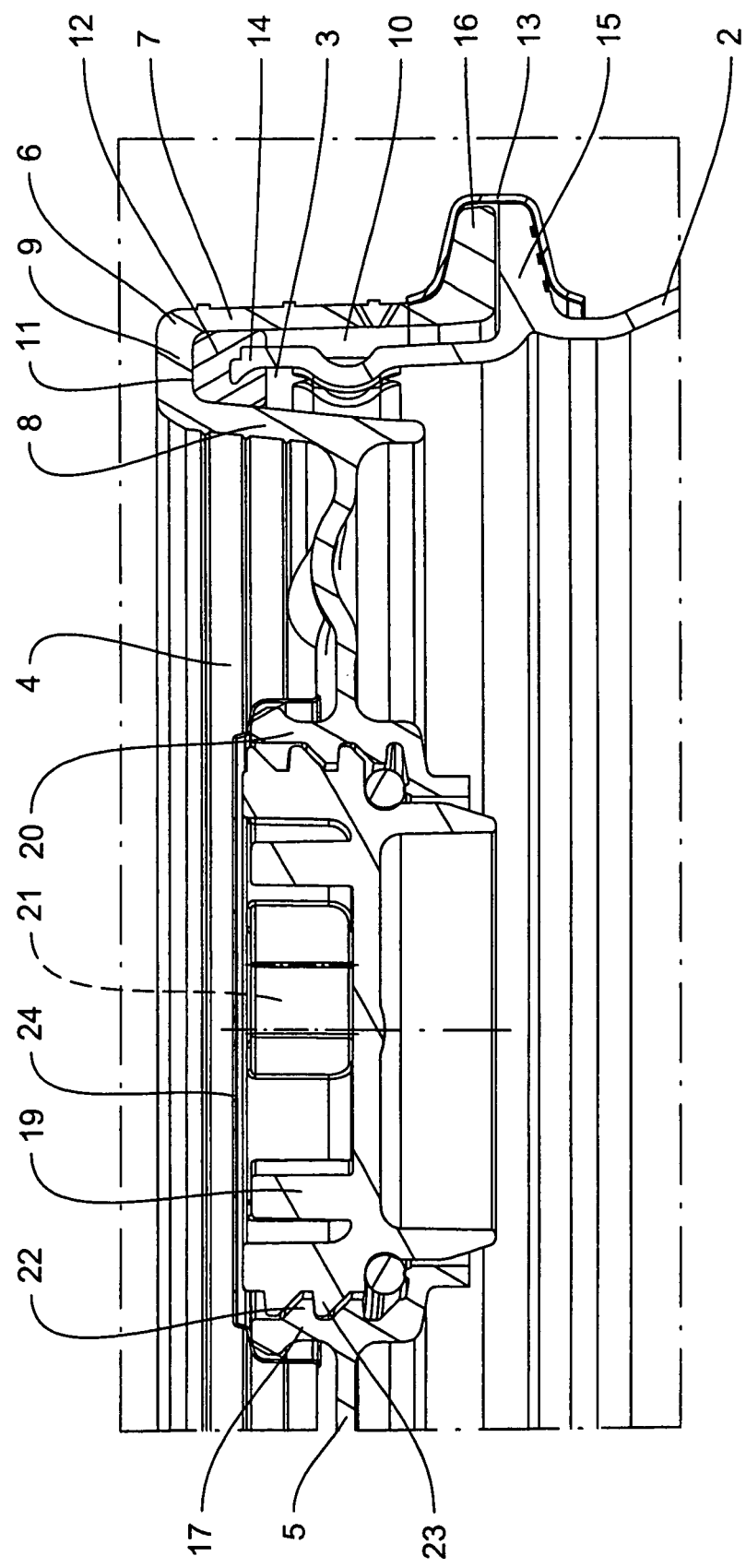

FIG. 3 is a partial longitudinal sectional view of the drum of FIG. 1 taken along line III-III of FIG. 2.

DETAILED DESCRIPTION OF THE INVENTION

The wide-neck drum 1 of thermoplastic material of FIG. 1 includes a cylindrical drum body 2 with an upper drum opening 3 which is closable by means of a bung cover 4.

The bung cover 4 has a flat bottom 5 with an upwardly protruding cover rim 6 which is formed by an outer edge 7 and an inner edge 8 and an annular web 9 which connects the outer and inner edges with each other. The outer and inner edges 7, 8 of the cover 4 define a downwardly open annular space 10 with a sealing bed 11 which is placed or foamed into a cover seal 12. The bung cover 4 is fastened on the drum opening rim 14 together with a clamping ring 13 which acts on a border 15 of the drum body 2 integrally formed at a distance below the drum opening rim 14 and on an annular flange 16 of the outer cover edge 7, wherein the bung cover 4 is sealed by the cover seal 12 against the drum opening rim 14 which extends into the annular space 10 of the bung cover.

The bung cover 4 is equipped with a filling and draining bung 17 which is offset outwardly relative to the center point 18 of the cover and whose bung socket 20, which is closable by a bung plug 19, is integrally formed above the bung hole 21 at the flat bottom 5.

The bung socket 20 of the filling and draining bung 17 has an internal sawtooth thread 22 S70×6 for screwing in the bung plug 19 which is equipped with a corresponding external sawtooth thread 23, wherein the plug 19 is sealed by means of a sealing cap 24 of steel which is equipped with two tear-off lugs 25.

While specific embodiments of the invention have been shown and described in detail to illustrate the inventive principles, it will be understood that the invention may be embodied otherwise without departing from such principles.

I claim:

1. A wide-neck drum of thermoplastic material with a removable bung cover and a clamping ring closure, the wide-neck drum comprising a bung socket of a filling and draining bung of the bung cover, which bung socket extends through a flat or slightly arched bottom of the bung cover and projects above the bottom of the bung cover, the bung socket forming a highest protrusion in a bottom plane of the bung cover, wherein the bung socket is arranged outwardly offset from a center point of the bung cover, wherein the bung socket is closeable by a bung plug, and wherein the bottom of the bung cover has an upwardly protruding rim for attaching the bung cover on a drum opening rim.

2. The drum according to claim 1, wherein the bung cover comprises an internal sawtooth thread S70×6 for screwing in the bung plug having a corresponding external sawtooth thread.

3. The drum according to claim 2, wherein the bung socket has a sealing cap of steel for sealing the bung socket.

4. A wide-neck drum comprising:
   a thermoplastic material drum body with a drum opening rim;
   a thermoplastic material removable bung cover comprising an upwardly protruding cover rim, the cover rim being attached on the drum opening rim, a flat or slightly arched bottom surface defining a bung cover bottom plane surrounded by the cover rim and a bung socket of a filling and draining bung of the bung cover, said bottom surface and said bung socket defining a bung cover bottom plane, said bung socket having a downwardly extending socket portion, extending below the bottom surface of the bung cover bottom plane, and having an upwardly extending socket portion, extending above the bottom surface of the bung cover bottom plane, the bung socket upwardly extending socket portion forming a highest protrusion in the bottom plane, wherein the bung socket is arranged outwardly offset from a center point of the bung cover;
   a clamping ring closure clamping the bung cover to the drum body; and
   a bung plug, wherein the bung socket is closed by the bung plug.

5. The drum according to claim 4, wherein:
   the bung cover comprises an internal sawtooth thread S70×6; and
   the bung plug has a corresponding external sawtooth thread.

6. The drum according to claim 4, further comprising a sealing cap of steel for sealing the bung socket.

7. The drum according to claim 6, wherein:
   the bung cover comprises an internal sawtooth thread S70×6; and
   the bung plug has a corresponding external sawtooth thread.

* * * * *

UNITED STATES PATENT AND TRADEMARK OFFICE
CERTIFICATE OF CORRECTION

PATENT NO.         : 8,727,175 B2
APPLICATION NO.    : 12/378283
DATED              : May 20, 2014
INVENTOR(S)        : Schütz

It is certified that error appears in the above-identified patent and that said Letters Patent is hereby corrected as shown below:

Title Page:

Item 30: Foreign Application Data should read

Feb. 16, 2008    (DE)    20 2008 002 185.5

Signed and Sealed this
Fourth Day of November, 2014

Michelle K. Lee
*Deputy Director of the United States Patent and Trademark Office*